_United States Patent Office_ 3,278,530
Patented Oct. 11, 1966

3,278,530
EPOXY AMINES AND THEIR PRODUCTION
William C. Doyle, Jr., Gulf Breeze, Fla., assignor, by mesne assignments, to Tenneco Chemicals, Inc., a corporation of Delaware
No Drawing. Filed Aug. 20, 1963, Ser. No. 303,417
10 Claims. (Cl. 260—240)

The present invention relates to novel epoxy amines and to their production. More particularly it relates to novel epoxy compounds also containing hydroxyl and amine groups.

It has been discovered that an amine can be reacted with only one of the two epoxy groups of allo-ocimene diepoxide to form novel epoxides of amino alcohols containing a hydroxyl group, an amino group and an epoxy group

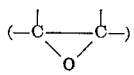

The course of the reaction and the novel reaction products can be represented by the following equation:

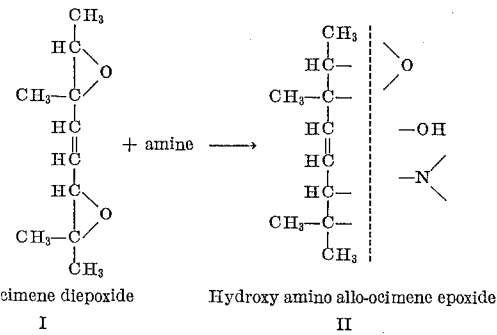

Allo-ocimene diepoxide     Hydroxy amino allo-ocimene epoxide
I                                      II In the foregoing representation of the reaction product, compound II, the epoxy oxygen (>O) is joined to one of the two pairs of adjacent carbon atoms, either the 2,3-carbon atoms or the 6,7-carbon atoms, the hydroxyl group (—OH) and the amino group (—N<) are individually joined to each of the other pair of carbon atoms, and (—N<) represents a monovalent, secondary or tertiary amino group joined to a single carbon atom in the chain of the allo-ocimene diepoxide starting material.

The amines which may be reacted with the allo-ocimene diepoxide are those primary and secondary amines containing a single nitrogen atom joined to at least one and not more than two replaceable hydrogen atoms having the formula

wherein $R_1$ is H or $R_2$, and $R_2$ represents an alkyl group, an aryl group, an aralkyl group, or an alkaryl group. When $R_1$ is not hydrogen, $R_1$ and $R_2$ may represent different groups. The term "secondary amine" includes heterocyclic compounds containing a single nitrogen atom in the ring also joined to a single replaceable hydrogen atom, so that in the formula

$R_2$ and $R_2$ together represent the residue of a heterocyclic ring in which the residual ring members are carbon or carbon and oxygen where the carbon is in each instance joined to two hydrogen atoms to form the ethylene group —$CH_2$—. The primary and secondary amines should be free of epoxy reactive groups such as carboxyl groups and hydroxyl groups. Illustrative primary and secondary amines are methylamine, ethylamine, n-propylamine, isopropylamine, n-hexylamine, dimethylamine, diethylamine, di-n-propylamine, di-sec. butylamine, di-tert. butylamine, methylethylamine, aniline, benzylaniline, toluidines, xylidines, mesidine, chloroanilines, anisidines, phenetidines, N-methylaniline, benzylamine, β-phenylethylamine, cyclohexylamine, dicyclohexylamine, piperidine, morpholine, and the like. Mixtures of such amines may be used.

When the amine is reacted with one of the epoxy groups of allo-ocimene diepoxide, the amine may react with either epoxy group and there are four possible isomers. Normally a mixture of isomers will be produced and usually may be separated by fractional distillation. The four possible isomers are represented by the following formulae in which dimethylamine is shown for purposes of illustration:

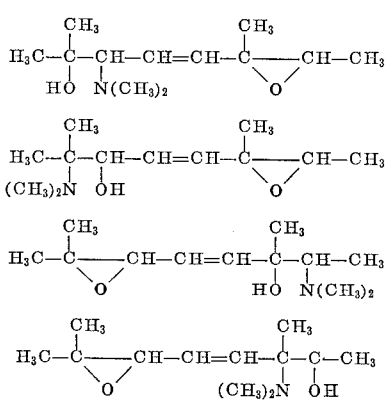

The relative proportions of reactants and the reaction conditions can be varied within a wide range. The amine and allo-ocimene diepoxide normally will react at low temperatures but, in general, the reactions will be maintained at a temperature in the range of 20° C. to 50° C. to reduce the time required. While higher temperatures may be used, higher temperatures are not preferred unless necessary, as it is more difficult to interrupt the reaction before there is excessive reaction of the amine with both epoxy groups of the diepoxide. Some amines, for example, aniline, require higher temperatures if the reaction is to be completed in a reasonable length of time. The reaction is exothermic and some cooling may be required to maintain the desired temperature. In order to provide better and more uniform temperature control, the reaction is preferably carried out in the presence of water or other solvents for the reactants. In general, water is not a solvent for the reaction products, and at the end of the reaction period the aqueous phase containing unreacted amine, if any, usually can readily be separated from the organic phase containing the reaction product.

The initial reactants may be charged to the reactor in stoichiometric amounts, that is, in ratio of mole per mole. Preferably an excess of allo-ocimene diepoxide is used to reduce the formation of the dihydroxy diamino derivatives of the diepoxide resulting from the reaction of the amine with both epoxy groups.

Following the reaction, the product may be separated from the reaction mixture by any convenient procedure. For example, the water and unreacted material, if any, may be separated by distillation, preferably under reduced pressure. The resulting crude product containing impurities and a mixture of isomers of hydroxy amino allo-ocimene epoxide may be subjected to fractional distillation to recover a relatively pure product which may be a single isomer or a mixture of isomers.

The allo-ocimene diepoxide which is used may be prepared in an manner and may be in the pure or crude form. For example, the starting material may be prepared by the thermal depolymerization of polymeric allo-ocimene peroxide which can be produced readily by the oxidation of allo-ocimene with air. For purposes of illustration, 100 grams of allo-ocimene is allowed to stand in a loosely-covered vessel at room temperature for four days. The oxidized material weighing 114 grams is dissolved in 100 ml. of diethyl ether and the resulting solution is mixed with 500 ml. of ethanol to precipitate a flocculent material which is collected, washed with three 100 ml. portions of ethanol, and dried. The resulting polymeric allo-ocimene peroxide weighing 21.2 grams is heated gradually to 65° C. at which point an exothermic reaction will occur to raise the temperature to 145° C. When cooled to room temperature, the product is a pale yellow fluid. The crude allo-ocimene diepoxide may be distilled under a reduced pressure of 2.5 mm. and a relatively pure fraction collected which distills at 85° C. to 87° C. Either the crude or redistilled allo-ocimene diepoxide may be used in the practice of the present invention. The allo-ocimene peroxide product prepared as described in U.S. Patent No. 3,038,906, J. H. Stump, Jr. et al., which contains allo-ocimene diepoxide may be used as the starting material in practicing the present invention.

Generally it is preferable to use a solvent for the amine and in the following examples water is used for this purpose. When the amine is not sufficiently soluble in water any other inert solvent may be used.

In the following examples the allo-ocimene dioxide used was prepared by deploymerizing polymeric allo-ocimene peroxide and the product contained a high percentage of allo-ocimene diepoxide along with some impurities. In some of the examples the allo-ocimene dioxide was redistilled and a center cut taken to obtain allo-ocimene diepoxide which was relatively free from impurities. The same stainless steel column was used in each example.

*Example 1*

To 630 grams of allo-ocimene dioxide there was gradually added with stirring 539 grams of 25% aqueous dimethylamine over a 2¾ hour period at 45° C. Slight intermittent heating was required to maintain this temperature. The mixture was stirred an additional two hours while being maintained at 45° C. The organic layer weighed 739 grams and was separated from the aqueous phase. The organic layer was distilled at 3 mm. pressure absolute through a column containing stainless steel packing and having a theoretical efficiency of a 10 plate column. First a small forerun consisting mainly of water was collected. Thereafter, 274 grams of recovered allo-ocimene dioxide, boiling point 60° C. to 85° C., was collected. This was followed by a 276 gram product cut, boiling point 112° C. to 123° C. This product cut containing a mixture of isomers of hydroxydimethylamino allo-ocimene epoxide represented a 61% yield based on unrecovered allo-ocimene dioxide. The product cut was pot distilled at 5 mm. pressure absolute and a center cut taken for analysis.

*Analysis.*—Calculated for $C_{12}H_{23}NO_2$: C=67.6%, H=10.8%, N=6.6%. Epoxy oxygen=7.5%. Found: C=67%, H=10.8%, N=5.9%. Epoxy oxygen=7%.

The infrared absorption spectrum of the product indicated a structure having a hydroxil group, a substituted amino group, carbon to carbon unsaturation (trans), and an epoxy group.

*Example 2*

A mixture of 370 g. of redistilled allo-ocimene dioxide and 175 g. of a 40% aqueous solution of methylamine was stirred for six hours at a temperature of 40–45° C. Some heating was required to maintain this temperature. The organic layer containing unreacted allo-ocimene dioxide and the reaction product was separated from the aqueous phase containing a small amount of unreacted methylamine. The separated organic material was fractionated through the distillation column of Example 1 at 5 mm. pressure absolute. Two forecuts weighing a total of 79 g. and consisting essentially of unreacted allo-ocimene dioxide were collected. Thereafter, four product cuts were separately collected at a temperature of 128° C. to 135° C. The four product cuts weighed 162.5 g. and constituted a yield of 47% of hydroxy methylamino allo-ocimene epoxide based on the amount of unrecovered allo-ocimene dioxide. The third of these four cuts was analyzed.

*Analysis.*—Calculated for $C_{11}H_{21}NO_2$: C=66.3%, H=10.6%, N=7.0%. Epoxy oxygen=8.0%. Found: C=66.5%, H=11.6%, N=6.0%. Epoxy oxygen=6.7%.

The infrared absorption spectrum of the product indicated a structure having a hydroxyl group, a substituted amino group, carbon to carbon unsaturation (trans), and an epoxy group.

*Example 3*

A solution of 146 grams of n-butylamine in 200 ml. of water was mixed with 380 grams of redistilled allo-ocimene dioxide. The temperature rose from 28° C. to 35° C. Stirring was continued for six hours and the temperature slowly dropped to 31.5° C. The organic phase was separated from the aqueous phase and distilled at 5 mm. pressure absolute through the column described in Example 1. A forerun of 255 grams of allo-ocimene dioxide was collected. Thereafter, threee product cuts (98 g. total) were collected at boiling points in the range of 145–7° C. The middle product cut was analyzed.

*Analysis.*—Calculated for $C_{14}H_{27}NO_2$: C=69.7%, H=11.2%, N=5.8%. Epoxy oxygen=6.6%. Found: C=70.0%, H=11.7%, N=4.9%. Epoxy oxygen=6.4%.

The infrared absorption spectrum of the product indicated a structure having a hydroxyl group, a substituted amino group, carbon to carbon unsaturation (trans), and an epoxy group.

*Example 4*

A mixture of 230 grams of redistilled allo-ocimene dioxide and 200 grams of a 50% aqueous solution of sec.-butylamine was stirred with warming at 35°–40° C. for ten hours. The organic layer was separated and fractionated through the column at 0.3 mm. pressure absolute. The forecut, boiling point 55°–80° C., weighed 166 grams and was recovered allo-ocimene dioxide. Thereafter, a 13-gram immediate cut was collected at a boiling point in the range of 80°–101° C. A product cut, boiling point 101°–105° C. and weighing 28.5 grams, was collected and analysed.

*Analysis.*—Calculated for $C_{14}H_{27}NO_2$: C=69.7%, H=11.2%, N=5.8%. Epoxy oxygen=6.6%. Found: C=70.6%, H=11.8%, N=5.0%. Epoxy oxygen=6.3%.

The infraraed absorption spectrum of the product indicated a structure having a hydroxyl group, a substituted amino group, carbon to carbon unsaturation (trans), and an epoxy group.

*Example 5*

A solution of 288 grams of piperidine in 500 ml. of water was added with stirring to 570 grams of redistilled allo-ocimene dioxide. The temperature of the mixture rose rapidly to 39° C. as a result of the exothermic heat. The mixture was then heated and stirred at 45° C. for 14½ hours. The organic layer was separated and fractionated through the column. A forecut of allo-ocimene dioxide, boiling point 67°–92° C. at 2–4 mm. weighing 145 grams, was collected. An intermediate cut weighing 31 grams, boiling point 92°–150° C. at 4 mm., was collected. Thereafter five product cuts, boiling point 150°–156° C. at 4 mm., were collected. The product cuts weighed 359 grams and the second of these five cuts was analysed.

*Analysis.*—Calculated for $C_{15}H_{27}NO_2$: C=71.2%, H=10.7%, N=5.5%. Epoxy oxygen=6.3%. Found: C=71.5%, H=11.4%, N=3.4%. Epoxy oxygen=6.5%.

The infrared absorption spectrum of the product indicated a structure having a hydroxyl group, a substituted amino group, carbon to carbon unsaturation (trans), and an epoxy group.

*Example 6*

A mixture of 570 grams of redistilled allo-ocimene dioxide, 315 grams of aniline, and 300 ml. of water was stirred for 19 hours while being heated at reflux, 97° C. The resulting reaction mixture was an emulsion which did not separate into layers. The emulsion was vacuum stripped at 5 mm. pressure absolute and 120° C. to remove the water and some unreacted aniline. The residue from this stripping treatment was pot distilled under vacuum. Nine fractions were collected and the first 5 weighed a total of 204 grams, boiling point 69°–189° C., at 1.2–2.5 mm. pressure absolute. The next four fractions weighed 562 grams, boiling point 189°–230° C., at 2.0–4.5 mm. pressure absolute. The infrared absorption spectra of the first five fractions had only trace absorption characteristic of an epoxide. The infrared absorption spectra of the second group, fractions 6–9, showed absorption characteristics of epoxide, monosubstituted phenyl, hydroxyl, substituted amine, and carbon to carbon unsaturation (trans). Fraction 8 was analysed with the following results:

*Analysis.*—Calculated for $C_{16}H_{23}NO_2$: C=73.6%, H=8.8%, N=5.4%. Molecular weight, 261. Found: C=71.0%, H=9.0%, N=5.6%. Molecular weight, 280, 291.

As previously indicated there are four possible isomers in the reaction product. The boiling range of each of the products indicates that a number of isomers are produced by this reaction. The dimethylamino product of Example 1 was in a high enough state of purity so that a meaningful nuclear magnetic resonance (NMR) spectrum could be obtained. Both the infrared and NMR spectra indicated that the hydroxyl group was attached to a tertiary carborn atom, eliminating isomers II and IV in which the hydroxyl group is attached to the 3-carbon or 7-carbon atom. In addition the NMR spectra contained a methyl proton signal probably due to the grouping

present only in isomer structure I where the hydroxyl is attached to the 2-carbon atom. Thus, this product is 2-hydroxyl-3-dimethylamino-6,7-epoxy-2,6-dimethyl-4-octene.

The monohydroxy monoamino allo-ocimene monoepoxides may be used as intermediates. For example, the monoepoxide may be further reacted with the same or a different amine in a mole to mole ratio to form the dihydroxy diamine having the formula:

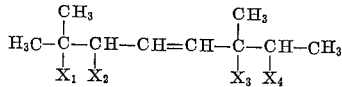

wherein each of two of the substituents $X_1$, $X_2$, $X_3$, $X_4$ represents a hydroxyl group, and each of the other two of said substituents represents a secondary or tertiary amino group. These compounds are curing agents for epoxy resins. Dimethyl amine may be reacted with the epoxy group of hydroxy-methylamino allo-ocimene epoxide under the conditions of Example 2 to produce the dihydroxy methylamino dimethylamino derivative of the diepoxide.

The monoepoxides of the present invention also may be used to cure epoxy resins.

*Example 7*

Various amounts of the epoxide compounds of Examples 1, 2 and 5 were added to 40 gram portions of an epoxy resin. The epoxy resin was a glycidyl ether of glycerine having an epoxide equivalent of 140–165. After stirring, the mixtures were allowed to stand overnight and then cured in an oven at elevated temperatures. All of the mixtures were viscous liquids after standing overnight.

| Epoxide | | Final Cure | | Final Resin |
|---|---|---|---|---|
| Ex. No. | Grams | Time, hrs. | Temp., °C. | |
| 1 | 4 | 4 | 140 | Flexible, clear resin. |
| 1 | 4 | 6 | 145 | Hard, clear resin. |
| 1 | 8 | 3 | 90 | Flexible, clear resin. |
| 1 | 8 | 4 | 140 | Do. |
| 2 | 8 | 15 | 150 | Do. |
| 5 | 4 | 3 | 90 | Do. |
| 5 | 4 | 20 | 145 | Do. |

*Example 8*

Dimethyl amino epoxide prepared as described in Example 1 was used as a curing agent for an epoxy resin which was the glycidyl ether of bis-phenol A (epoxide equivalent 180–195). Four grams of the epoxide and 4 grams of triethylenetetramine were added to separate 40 gram portions of the epoxy resin and mixed. After standing overnight the mixture containing the epoxide was a viscous liquid while the other mixture was a stiff gel. The mixture containing the triethyltetramine formed a hard clear resin after being cured for 1 hour at 145° C. in an oven. The epoxide-containing mixture formed a flexible clear resin upon being cured for 6 hours at 145° C.

*Example 9*

Mixtures of a hydroxy amino epoxy resin have a long shelf life. A solution of 40 grams of the epoxy resin of Example 7 and 4 grams of hydroxy dimethyl amino epoxide produced as described in Example 1 was allowed to stand at room temperature. The initial viscosity of the solution was N (Gardner). The viscosity of the epoxy resin alone was R. After 16 hours the viscosity of the solution was pourable. By the end of 3 months a firm gel had formed.

I claim:

1. An epoxide selected from the group consisting of:

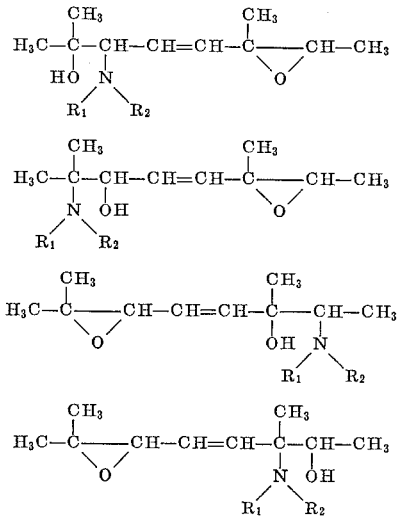

and mixtures thereof, wherein

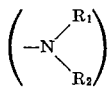

represents an amino group free of epoxy-reactive groups; $R_1$ represents a member selected from the group consisting of H and $R_2$, $R_2$ represents a member selected from the group consisting of lower alkyl, phenylethyl, benzyl, chlorophenyl, diphenylmethane, phenyl containing from 0 to 3 lower alkyl groups on the ring, methoxy-phenyl, ethoxy-phenyl, cyclohexyl, and mixtures thereof; and $R_1$ and $R_2$ together represent the residue of a heterocyclic ring containing from 4 to 5 carbon atoms.

2. An epoxide as claimed in claim 1 in which said amino group contains from 1 to 2 lower alkyl radicals on the nitrogen atom.

3. An epoxide as claimed in claim 1 in which said amino group is the amino group of a heterocyclic amine containing from 4 to 5 carbon atoms.

4. An epoxide as claimed in claim 1 in which said amino group is the amino group of piperidine.

5. An epoxide as claimed in claim 1 in which said amino group is the amino group of aniline.

6. 2 - hydroxy - 3 - dimethylamino - 6,7 - epoxy - 2,6-dimethyl-4-octene.

7. 2 - hydroxy - 3 - methylamino - 6,7 - epoxy - 2,6-dimethyl-4-octene.

8. 2 - hydroxy - 3 - butylamino - 6,7 - epoxy - 2,6-dimethyl-4-octene.

9. 2 - hydroxy - 3 - piperidino - 6,7 - epoxy - 2,6-dimethyl-4-octene.

10. 2 - hydroxy - 3 - anilino - 6,7 - epoxy - 2,6-dimethyl-4-octene.

References Cited by the Examiner
UNITED STATES PATENTS

| | | | |
|---|---|---|---|
| 2,666,783 | 1/1954 | Lytton | 260—490 |
| 2,953,570 | 9/1960 | Rudner | 260—294.7 |
| 3,156,727 | 11/1964 | Sidi et al. | 260—247.5 |

OTHER REFERENCES

Naves et al.: Bull Soc. Chim. (France), #T23 July–December 1956 (pages 1768–1773).

WALTER A. MODANCE, *Primary Examiner.*

JOHN D. RANDOLPH, *Examiner.*

A. D. SPEVACK, *Assistant Examiner.*